July 6, 1926. Re. 16,375

R. F. SMITH

ENERGY TRANSLATING DEVICE

Original Filed May 22, 1915

Inventor
R. F. Smith
by G. P. Wilson
Attorney

Reissued July 6, 1926. Re. 16,375

UNITED STATES PATENT OFFICE.

REGINALD F. SMITH, OF CUSHING, OKLAHOMA, ASSIGNOR TO ALLIS-CHALMERS MANUFACTURING COMPANY, OF MILWAUKEE, WISCONSIN, A CORPORATION OF DELAWARE.

ENERGY-TRANSLATING DEVICE.

Original No. 1,279,769, dated September 24, 1918, Serial No. 30,235, filed May 22, 1915. Application for reissue filed May 15, 1926. Serial No. 109,439.

This invention relates to improvements in the construction and operation of energy translating devices for furnishing energy with one or more constant characteristics.

An object of the invention is to provide an improved form of energy translating device utilizing an expansible fluid and which is simple in construction and efficient in operation, and which is adapted to furnish energy with one or more substantially constant characteristics. Several of the more specific objects of the invention are as follows:

To provide an improved form of energy translating device including an engine actuated by an expansible fluid and effective to absorb and translate energy of such fluid during a drop in the pressure thereof to a desired value at which said fluid is adapted to be utilized in an auxiliary energy absorber, energy translated by the engine being utilized and the speed of the engine being maintained constant through a synchronous alternating current generator connected to a circuit of constant frequency, and wherein the engine is adapted to deliver a variable amount of energy to the auxiliary energy absorber while maintaining substantially constant one or more characteristics of the energy delivered.

To combine with a heat engine having its speed controlled by an external agency as described hereinabove, means for controlling both the pressure and the temperature of the engine exhaust.

To control the energy supplied to the engine of an energy translating device of the character described hereinabove, by variations in characteristics of the engine exhaust.

A clear conception of several embodiments of the invention may be had by referring to the drawing accompanying and forming a part of this specification in which like reference characters designate the same or similar parts in the various views.

Figure 1:
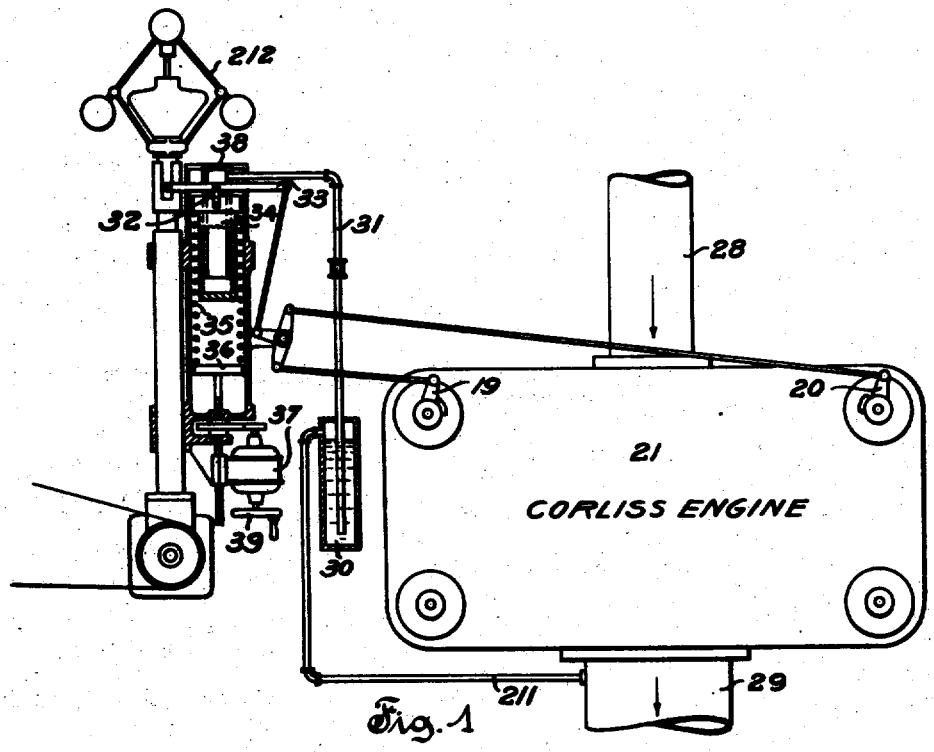
Figure 1 is an elevation of a Corliss engine cylinder showing means for controlling the power delivered by the engine by variations in the temperature and pressure of the exhaust, the controlling means being shown partly in section.
Figure 2:
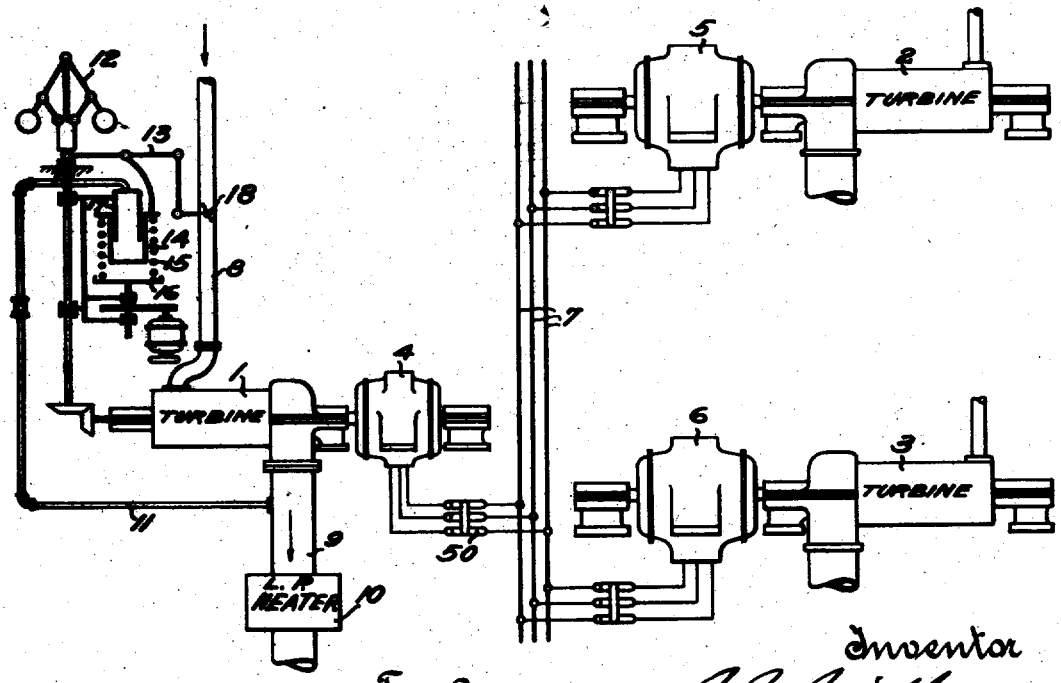
Fig. 2 is a diagrammatic disclosure of a system involving an application of the present invention.

Referring specifically to Fig. 2, the main power line 7 is normally supplied with power by main generators 5, 6, driven by energy translating devices or heat engines 2, 3, respectively. In Fig. 2 the energy translating devices are shown as heat engines or steam turbines 2, 3, while the generators 5, 6 are disclosed as of the polyphase alternating current type. It is not, however, intended to limit the present invention by such disclosure as other forms of energy translating devices and generators within the scope of the appended claims, might be substituted for those disclosed, providing they operate in synchronism to thus definitely establish and maintain a constant frequency of the electrical energy of the power line and to determine the constant speed of one of them supplying a heating system. An auxiliary energy translating device or heat engine, disclosed in Fig. 2 as a steam turbine 1, and in Fig. 1 as a Corliss engine 21, is drivingly connected to an auxiliary generator 4, which is of the polyphase synchronous alternating current type and also delivers its power to the main power line 7. The auxiliary heat engine or turbine 1 is supplied with motive fluid through the inlet pipe 8, the flow of motive fluid being controllable by means of a throttle valve 18. The auxiliary heat engine or turbine 1 delivers its exhaust into an exhaust pipe 9, which leads to a low pressure heater 10, or to some other point at which it is desired to utilize the exhaust steam. The subject of industrial application of the steam which is shown as a low pressure heater 10, may be either a heating system, a cooking device, heaters in a woolen or cotton mill, or any other device for utilizing low pressure steam at a substantially constant temperature or pressure. While it is desired in the present disclosure, to maintain the pressure and the temperature substantially constant, it may sometimes be desirable in some forms of heat engines to maintain only one of these characteristics substantially constant irrespective of variations in the other, such departure from the present operation within the scope of the appended claims, being within the scope of the present invention.

The turbine 1 is provided with a safety governor 12 which is so set either by weighting or otherwise setting the same, that its collar will remain in engagement with a stop 23 and will leave this stop and act upon the throttle valve 18 only upon abnormal speed changes. The collar of the governor 12 engages and serves as a fulcrum for an end of a floating lever 13, the mid portion of which is pivoted to a movable cup-shaped plunger 14, and the opposite end of which is connected to the throttle valve 18. The cup-shaped plunger 14 is reciprocable upon a stationary abutment 17. A helical spring 15 has an end engaging a flange of the plunger 14 and has its opposite end reacting against the adjustable spring support 16. The plunger 14 is movable in opposition to the pressure of the spring 15 by means of fluid pressure applied to the interior of the plunger 14 and of the abutment 17, through the pipe 11 which communicates with the turbine exhaust 9. The spring support 16 is adjustable to vary the pressure exerted by the springs 15 upon the plunger 14 by any suitable means, such as an electric adjusting motor or a handwheel. This adjustment of the spring 15 provides means for adjusting the position of the throttle valve 18 to establish a predetermined constant pressure in the exhaust pipe 9.

In the arrangement of elements disclosed in Fig. 1, the heat engine is disclosed as a Corliss engine 21, having knock-off levers 19, 20, for controlling the admission of steam to, and consequently the power furnished by, the engine. The steam is admitted to the Corliss valves in the usual manner by means of a steam pipe 28, being exhausted from the engine 21 through an exhaust pipe 29. The Corliss engine 21 is prevented from over-speeding by means of a fly-ball governor 212, which is so set by weighting or otherwise, as to come into action only upon excessive changes in speed. The floating lever 33 which engages and normally utilizes the collar of the governor 212 as a fulcrum, has its mid portion connected by means of a link 32 to the upper end of the movable cup-shaped plunger 34. The plunger 34 is reciprocable upon the stationary abutment 38, the interior of which, as well as the interior of the plunger, being filled with oil. The free end of the lever 33 is connected by means of suitable linkage to the knock-off levers 19, 20, so that any movement of the lever 33 caused by movement of either the plunger 34 or the governor collar, is transmitted to the knock-off levers 19, 20, to change the point of cut off.

The exhaust pipe 29 is connected by means of a pipe 211 to the upper end of an oil chamber 30. The oil chamber 30 is substantially filled with oil and has a pipe 31 connecting the lower portion of the oil bath with the upper interior portion of the abutment 38. The pressure exerted by the exhaust steam in the exhaust pipe 29 is transmitted through the pipe 211 to the upper surface of the oil in the chamber 30, being further transmitted by this oil through the pipe 31 to the upper interior surface of the plunger 34. The helical spring 35 has its upper end engaging a flange on the plunger 34 and has its opposite end reacting against the adjustable spring support 36. The support 36 is adjustable to vary the spring pressure and hence the position of the plunger 34 either from the main switch-board by means of a motor 37, or manually by means of a suitable hand-wheel 39 mounted upon the shaft of the motor 37. The shaft of the adjusting motor is connected by means of suitable gearing to a screw-threaded rod which carries the spring support 36 and the screw threads of which engage threads in the frame which supports the abutment 38. By adjusting the spring support 36, the position of the knock-off levers may be readily varied to establish a predetermined constant pressure and temperature in the exhaust pipe 29.

During the normal operation of the system as disclosed in Fig. 2, the turbines 2, 3, and the generators 5, 6, are supplying current to the main power line 7. If no steam is being utilized at the low pressure heater 10, the throttle valve 18 of the auxiliary heat engine or turbine 1 is closed and the switch 50 connecting the generator 4 with the main line 7 is preferably opened. If the switch 50, at times when no steam is being utilized in the low pressure heater 10 is closed, the generator 4 will be operated as a synchronous motor and will be driving the turbine 1, this being an unusual condition of operation of the system. As such a condition of operation is undesirable, if no steam is to be utilized in the heater for any length of time, it is preferable to cut out the generator 4 from the main line 7 by opening the switch 50 until it is again desired to utilize the low pressure steam.

When it is desired to use steam in the heater, the switch 50 is closed and the throttle valve 18 is opened until the desired pressure and temperature is established in the exhaust pipe 9. The pressure in the exhaust pipe 9 then automatically acts through the pipe 11 upon the interior of the abutment 17 and forces the plunger 14 in a downward direction tending to close the throttle valve 18. By adjusting the position of the spring support 16, the amount of steam admitted to the turbine and the pressure in the pipe 9 may be readily carried to suit the required conditions.

The operation of the device disclosed in Fig. 1 is analogous to that of the device disclosed in Fig. 2. The engine is started by manipulating the throttle in the usual manner and adjusting the spring support 36, either by means of the motor 37 or the hand-wheel 39, after which the position of the knock-off levers 19, 20, is automatically controlled by the steam pressure in the exhaust pipe 29 acting through the pipe 211, oil chamber 30, pipe 31, and plunger 34. If the pressure in the exhaust pipe 29 increases, the knock-off levers 19, 20, will be adjusted so as to decrease the amount of steam admitted to the engine 21, thereby decreasing the power furnished by the engine. If the pressure in the exhaust pipe 29 decreases, the knock-off levers 19, 20, will be adjusted to increase the amount of steam admitted to the engine, thereby increasing the power delivered by the engine.

As the generator 4 is operating synchronously in parallel with the generators 5, 6, the speed of the auxiliary engine driving the generator 4 will be maintained substantially constant irrespective of the amount of energy supplied to the engine or of the power delivered by the engine. The regulating device applied to the auxiliary engine for a predetermined setting or adjustment of the spring, automatically controls the admission of motive fluid so as to maintain substantially constant the pressure and hence the temperature of the exhaust. The slightest variations in exhaust pressure will act immediately to vary the amount of motive fluid admitted to the engine so as to reestablish the desired exhaust pressure and maintain the same substantially constant. While in the present disclosure due to the use of steam as a motive fluid, the maintaining of a constant temperature of the exhaust accompanies maintaining a constant pressure thereof, it will be noted that the exhaust temperature with the use of other motive fluids, might also be maintained constant irrespective of the pressure thereof. It will be noted that the spring 15, 35, may be adjusted either to produce predetermined pressures in the exhaust to suit various conditions in the heater or to vary the relation between the energy supplied to, and the energy abstracted by, the engine.

By controlling the speed of the auxiliary heat engine by parallel operation of the alternating current generator 4 driven by such engine with the other synchronously operating alternating current generating units connected to the power line 7, the speed of this engine will be automatically maintained substantially constant. If, however, the main line 7 should fail to receive a supply of current from the generators 5, 6, or if the connection between the generator 4 and the main line 7 should be broken, overspeeding of the auxiliary unit will be prevented by means of the safety governor 12, 212, which will automatically act to reduce the admission of motive fluid to the auxiliary prime mover.

It should be understood that it is not desired to be limited to the exact details of construction shown and described, for obvious modifications within the scope of the appended claims will occur to a person skilled in the art.

It is claimed and desired to secure by Letters Patent:

1. In combination in a power system, an energy translating device utilizing an expansible fluid as its motive energy and having its exhaust arranged to supply variable requirements of a device for consuming energy of said exhausted fluid, an alternating current electrical power circuit, means for supplying thereto alternating current of substantially constant frequency, a synchronous alternating current generator driven by said energy translating device and operatively connected to said electrical power circuit, and means responsive to a characteristic associated with the fluid exhausted from said energy translating device for controlling the supply of expansible fluid to said energy translating device.

2. In combination in a power system, an energy translating device utilizing an expansible fluid as its motive energy and having its exhaust arranged to supply variable requirements of an energy consuming device, an alternating current electrical power circuit carrying energy of substantially constant frequency, means responsive to an energy characteristic dependent upon the fluid discharged from said energy translating device for controlling the supply of expansible fluid to said energy translating device, and means extraneous to said energy translating device for causing the latter to operate at a substantially constant speed in spite of variation in the amount of energy supplied thereto, said latter means comprising a synchronous alternating current generator operatively connected to said electrical power circuit.

3. In combination in a power system, an energy translating device having an inlet for a supply of expansible fluid, an outlet for exhausting said fluid at a lower tension, an alternating current electrical power circuit, means for supplying energy thereto and maintaining the frequency thereof substantially constant, a synchronous alternating current generator operatively connected in power relation to said energy translating device and operatively connected to said electrical power circuit whereby the frequency of the current in said generator and the speed of said generator and energy translating device are maintained substantially constant, and means dependent upon a characteristic of the fluid exhausted from said outlet for regulating the supply of fluid at the inlet of said energy translating device whereby a characteristic of the fluid exhausted from said outlet is maintained in accordance with a predetermined plan.

4. In combination in a power system, an energy translating device having an inlet for a supply of expansible fluid and an outlet for exhausting said fluid at a lower tension, an energy consuming device adapted to receive fluid exhausted from said outlet, an alternating current electrical power circuit, means for supplying energy thereto and maintaining the frequency thereof substantially constant, means automatically responsive to a condition attendant upon the fluid exhausted from said energy translating device for controlling the inlet of said energy translating device, and means operative to utilize the excess of energy in the fluid supplied to said energy translating device beyond that required for said energy consuming device and to maintain the speed of said energy translating device substantially constant in spite of variations in the amount of fluid energy supplied thereto, said means comprising a synchronous alternating current generator connected in driven relation to said energy translating device and electrically connected to said alternating current power circuit.

In testimony whereof, the inventor's signature is affixed hereto.

REGINALD F. SMITH.